(12) United States Patent
Manfé

(10) Patent No.: US 12,530,240 B2
(45) Date of Patent: Jan. 20, 2026

(54) DETECTING PEAK ACTIVITY OF COMPUTING RESOURCES

(71) Applicant: Oracle International Corporation, Redwood Shores, CA (US)

(72) Inventor: Thierry Manfé, Grenoble (FR)

(73) Assignee: Oracle International Corporation, Redwood Shores, CA (US)

( * ) Notice: Subject to any disclaimer, the term of this patent is extended or adjusted under 35 U.S.C. 154(b) by 430 days.

(21) Appl. No.: 18/321,664

(22) Filed: May 22, 2023

(65) Prior Publication Data

US 2024/0394112 A1 Nov. 28, 2024

(51) Int. Cl.
*G06F 9/50* (2006.01)
*G06F 11/30* (2006.01)

(52) U.S. Cl.
CPC .......... *G06F 9/505* (2013.01); *G06F 11/3024* (2013.01); *G06F 11/3055* (2013.01)

(58) Field of Classification Search
None
See application file for complete search history.

(56) References Cited

U.S. PATENT DOCUMENTS

| | | | |
|---|---|---|---|
| 2007/0165570 A1* | 7/2007 | Fritz | G06F 9/5011 370/329 |
| 2016/0170919 A1* | 6/2016 | Blagodurov | G06F 11/3452 711/154 |
| 2020/0034168 A1* | 1/2020 | Singleton, IV | G06F 9/5044 |

* cited by examiner

*Primary Examiner* — Craig C Dorais
(74) *Attorney, Agent, or Firm* — Invoke

(57) ABSTRACT

Systems that analyze the performance of a computing resource based on a usage information timeline are disclosed. A system detects peak activity periods occurring in the usage information of the computer resource and scores the individual peak activity periods. Based on the respective scores, the system identifies an anchor period from the peak activity periods. Using the anchor period, the system aggregates the peak activity periods around the anchor period. The aggregating include incrementally sliding a window through the usage information around the anchor period, wherein increments represent candidate activity period. The system selects a candidate activity period including peak activities periods with the greatest workload. The system allocates capacity to the computer resource based on characteristic of the selected candidate activity period.

30 Claims, 11 Drawing Sheets

DETECTING PEAK ACTIVITY OF COMPUTING RESOURCES

TECHNICAL FIELD

Embodiments of the invention relate to the field of computing systems, and more specifically, to analyzing the performance of computing systems.

BACKGROUND

Cloud computing systems comprise shared pools of physical and virtual infrastructure for providing on-demand computing services over the Internet. The shared pools enable organizations to focus on their core businesses instead of expending resources on computer infrastructure and maintenance.

Capacity management attempts to provide for non-disruptive operation of cloud computing systems by provisioning adequate computing resources to meet changing customers' demands. Using capacity management software, network administrators can create forecasts used to allocate additional resources or provide alerts of potential resource exhaustion. Unfortunately, forecasts of resource demand can be imprecise, which leads to inefficient and incorrect resource allocation, starvation and waste.

The approaches described in this Background section are ones that could be pursued, but not necessarily approaches that have been previously conceived or pursued. Unless otherwise indicated, it should not be assumed that any of the approaches described in this section qualify as prior art.

BRIEF DESCRIPTION OF THE DRAWINGS

The embodiments are illustrated by way of example and not by way of limitation in the figures of the accompanying drawings. In the drawings.

DETAILED DESCRIPTION

Figure 1:
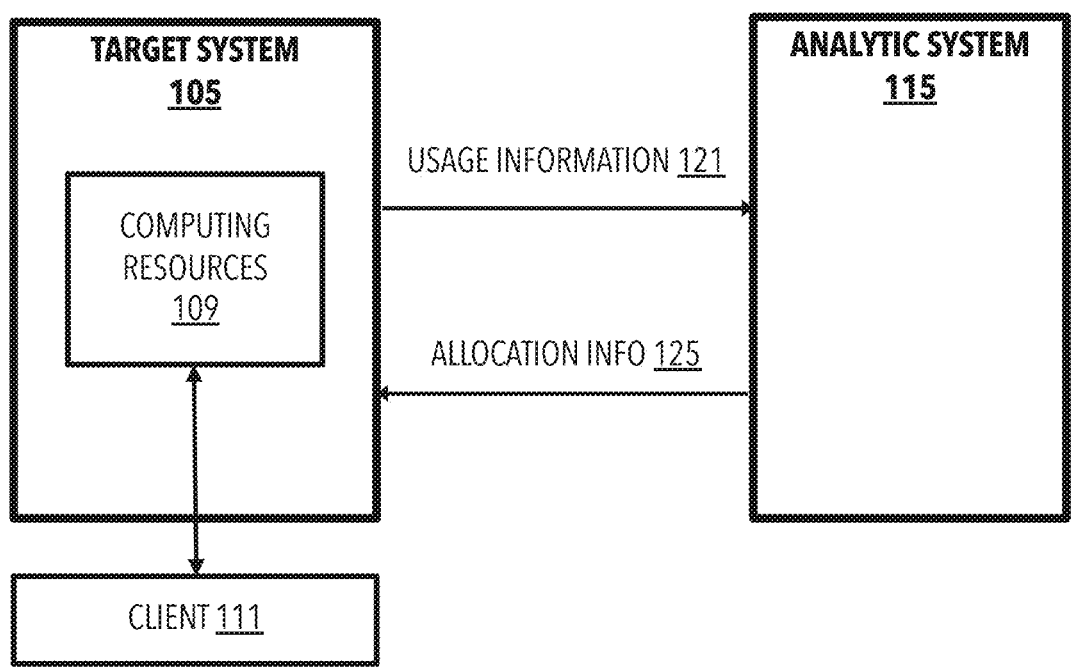
FIG. 1 illustrates a functional block diagram of an example system environment in accordance with one or more embodiments.

In the following description, for the purposes of explanation, numerous specific details are set forth in order to provide a thorough understanding. One or more embodiments may be practiced without these specific details. Features described in one embodiment may be combined with features described in different embodiments. In some examples, well-known structures and devices are described with reference to a block diagram in order to avoid unnecessarily obscuring the present invention.

The embodiments are illustrated by way of example and not by way of limitation in the figures of the accompanying drawings. It should be noted that references to "an" or "one" embodiment in this disclosure are not necessarily to the same embodiment, and they mean at least one.

This Detailed Description section includes the following subsections:
A. GENERAL OVERVIEW
B. SYSTEM ENVIRONMENT
C. SYSTEM ARCHITECTURE
D. DETERMINING PEAK ACTIVITY
E. COMPUTER NETWORKS AND CLOUD NETWORKS
F. MISCELLANEOUS; EXTENSIONS
G. HARDWARE OVERVIEW

A. General Overview

Systems, methods, and computer-readable media disclosed herein are directed to analyzing the performance of computing systems. One or more embodiments determine peak activity of computing resources based on a timeline of usage information. Peak activity is determined by identifying peak activity periods occurring in the timeline. The peak activity periods can be, for example, time periods in which the usage information of the computing resource exceeds a predetermined threshold. An anchor peak activity period is determined by scoring the peak activity periods based respective workloads and selecting a peak activity period having the highest score. By incrementally advancing a sliding window through the anchor peak activity period, the system aggregates workloads of the peak activity periods included in the window during the individual increments of the window. The system allocates resources based on characteristic of the target activity period.

In a non-limiting example, a system can identify peak activity periods occurring in central processing unit ("CPU") usage information during which the utilization is above a threshold. The system can rank and/or sort the peak activity periods based on their intensity and select the most intense peak activity period as an anchor peak activity period for peak activity analysis. The system can aggregate workloads of peak activity periods occurring in a fixed-duration time window around the anchor peak activity period. Aggregating the workloads includes incrementally advancing a window over the anchor peak activity period. For individual increments, the system determines the workload of peak activity periods included in the window. Based on the aggregated workloads during the individual increments, the system identifies an increment having the greatest workload as the peak activity period.

Embodiments consistent with the present disclosure improve the functioning of computing systems by increasing the accuracy of usage analysis forecasts. The improved accuracy results in more efficient resource allocation decisions by, for example, network administrators and capacity management software. Further, the improved forecasts prevent resource starvation and waste of shared resources, such as in cloud networks.

While this General Overview subsection describes various example embodiments, it should be understood that one or more embodiments described in this Specification or recited in the claims may not be included in this subsection.

B. System Environment

FIG. 1 shows a system block diagram illustrating an example of a computing environment 100 for implementing systems and processes in accordance with one or more embodiments. The computing environment 100 includes a target system 105, one or more client devices 111, and an analytic system 115, which can be communicatively connected via one or more communication links. The communication links can be wired and/or wireless information channels, such as the Internet, an intranet, an Ethernet network, a wireline network, a wireless network, a mobile communications network, and/or another communication network. While the example environment 100 illustrated in FIG. 1 shows the target system 105, the client system 111, and the analytic system 115 as separate blocks, it is understood that hardware and/or functionality of two or more of the target system 105, the client system 111, and the analytic system 115 can be combined into a single device or system. For example, the target system 105 and analytic system can be components of a single cloud computing environment.

The target system 105 can be any type of computing device, system, or environment. comprising one or more hardware computing resources 109, including, servers, processors, memory, storage, and the like. The target system 105 can instantiate, allocate, and control the computing resources 109 to provision computing hardware and services to the client 111. Some embodiments of the target system 105 can be a cloud computing network or the like. As described above and detailed below. the computing resources of the target system 105 can be pooled to serve multiple clients 111 using a multi-tenant model, with different physical and virtual resources dynamically provisioned according to client 111's demand.

The client device 111 can be one or more computing devices allowing clients to access and interact with target system 105. For example, the client device 111 can be, but is not limited to, a personal computer system, server computer system, thin client, thick client, hand-held or laptop device, multiprocessor system, microprocessor-based system, set top box, programmable consumer electronic, network PC, minicomputer system, mainframe computer system, and the like. The client device 111 can include one or more processors that process software or other computer-readable instructions and include a memory to store the software, computer-readable instructions, and data. The client device 111 can also include a communication device to communicate with analytic system 115 via the communication links 117. Additionally, the client device 111 can generate a computer-user interface enabling a user to interact with the target system 105 using input/output devices.

The analytic system 115 can be one or more computing devices that control and optimize usage of the computing resources 109 of the target system 105. As described in greater detail below, the analytic system 115 can obtain usage information 121 of the computing resources 109 in the target system 105. Based on the usage information 121, the analytic system 15 can determine peak activity and workload information of the computing resources 109. The peak activity and workload information can be used to determine allocation information 125 for modifying the allocation of the computing resources 109 to the target system 105. For example, based on the allocation information 125, the target system 105 can allocate additional processing nodes to a network cluster.

The usage information 121 can be performance information collected from the target system. For example, the analytic system 115 can use a capacity management application or performance monitoring utility, such as EXA-WATCHER by Oracle International Corporation of Redwood Shores, CA, which records performance data on the storage servers and database servers over time (e.g., processor and storage usage) and presents the performance data in time-series graphs illustrating changes in usage and performance over time using an interactive graphic user interface. For example, the utility can log and display a timeline of resource usage, such as processor usage vs. time, memory usage vs. time, storage usage vs. time, energy usage vs. time, etc. The usage quantities can be values representing magnitudes (e.g. 0 megabytes to 250 megabytes) or percentages (e.g., 0% to 100%). The time increments can be seconds, minutes, hours, days, months, etc.

C. System Architecture

Figure 2:
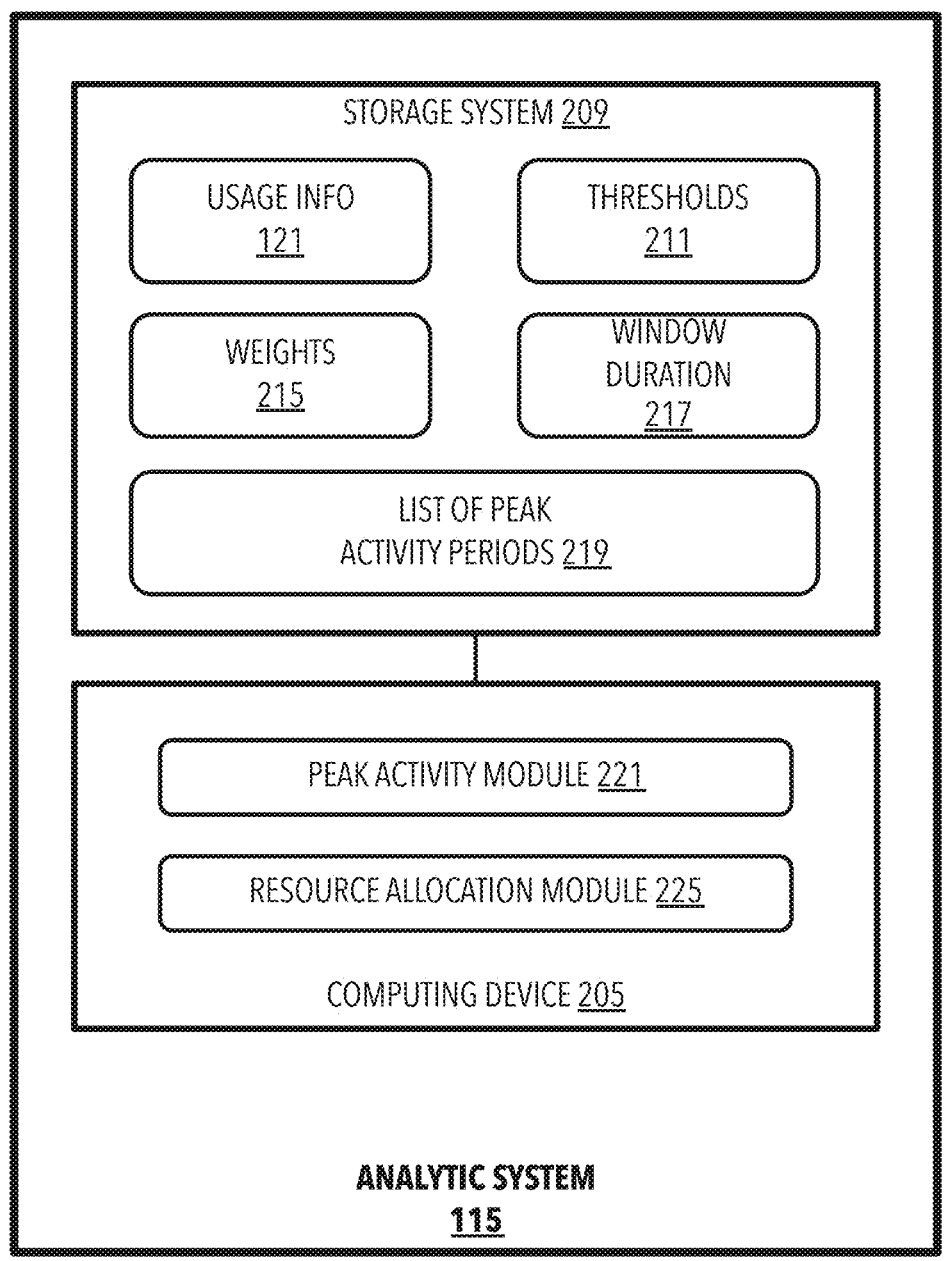
FIG. 2 illustrates a block diagram of an example analytic system in accordance with one or more embodiments.

FIG. 2 shows a system block diagram illustrating an example of an analytic system 115 in accordance with one or more embodiments. The analytic system 115 can be the same or similar to that described above. The analytic system 115 includes hardware and software that perform processes and functions disclosed herein. The analytic system 115 can include a computing device 205 and a storage system 209. The computing device 205 can include one or more processors (e.g., microprocessor, microchip, or application-specific integrated circuit) and one or more computer-readable memories (e.g., random access memory, read only memory, flash memory, etc.)

The storage system 209 can comprise one or more non-transitory computer-readable, hardware storage devices that store information and program instructions used by the processes and functions disclosed herein. For example, the storage system 209 can include one or more flash drives and/or hard disk drives. One or more embodiments of the storage system 209 stores usage information 121, thresholds 211, weights 215, window duration 217, and list of peak activity periods 219. The usage information 121 can be the same or similar to those previously described above. The thresholds 211, the weights 215, window 217, and list of peak activity periods 219 can be values and information used for determining peak activity and workload of computing resources (e.g., computing resources 109), as described in greater detail below.

The computing device 205 can execute peak activity module 221 and a resource allocation module 225, which can each be software, hardware, or a combination thereof. The peak activity module 221 determines peak activity periods of computing resources (e.g., one or more of computing resources 109) and peak workloads of the computing resource based on the usage information 121. The resource allocation module 225 determines whether to modify a quantity, mix, or distribution of computing resources in a target system (e.g., target system 105) based on the characteristics of the peak activity period.

It is noted that the analytic system 115 can comprise any general-purpose computing article of manufacture capable of executing computer program instructions installed thereon (e.g., a personal computer, server, etc.). However, the analytic system 115 is only representative of various possible equivalent-computing devices that can perform the processes described herein. To this extent, in embodiments, the functionality provided by the analytic system 115 can be any combination of general and/or specific purpose hardware and/or computer program instructions. In each embodiment, the program instructions and hardware can be created using standard programming and engineering techniques, respectively.

The components illustrated in FIG. 2 may be implemented in software and/or hardware. Each component may be distributed over multiple applications and/or machines. Multiple components may be combined into one application and/or machine. Operations described with respect to one component may instead be performed by another component.

D. Determining Peak Activity

The flow diagrams in FIGS. 3A, 3B, 3C, and 3D illustrate functionality and operations of systems, devices, processes, and computer program products according to various implementations of the present disclosure. Each block in FIGS. 3A, 3B, 3C, and 3D can represent a module, segment, or portion of program instructions, which includes one or more computer executable instructions for implementing the illustrated functions and operations. In some implementations, the functions and/or operations illustrated in a particular block of the flow diagrams can occur out of the order shown in FIGS. FIGS. 3A, 3B, 3C, and 3D. For example, two blocks shown in succession can be executed substantially concurrently, or the blocks can sometimes be executed in the reverse order, depending upon the functionality involved. Additionally, in some implementations, the blocks of the flow diagrams can be rearranged in different orders. Further, in some implementations, the flow diagram can include fewer blocks or additional blocks. It is also noted that each block of the flow diagrams and combinations of blocks in the flow diagrams can be implemented by special-purpose hardware-based systems that perform the specified functions or acts, or combinations of special-purpose hardware and computer instructions.

FIGS. 3A, 3B, 3C, and 3D illustrate a set of operations of an example process 300 for determining peak activity of a computing resource. Some embodiments of the process 300 include the following phases: a detection phase 301, a comparison phase 303, an aggregation phase 305, and an allocation phase 307. It is understood that the phases 301, 303, 305, and 307 are merely used for the sake of explanation. Other embodiments of the process 300 can combine one or more phases or can lack any phases.

Figure 3A:
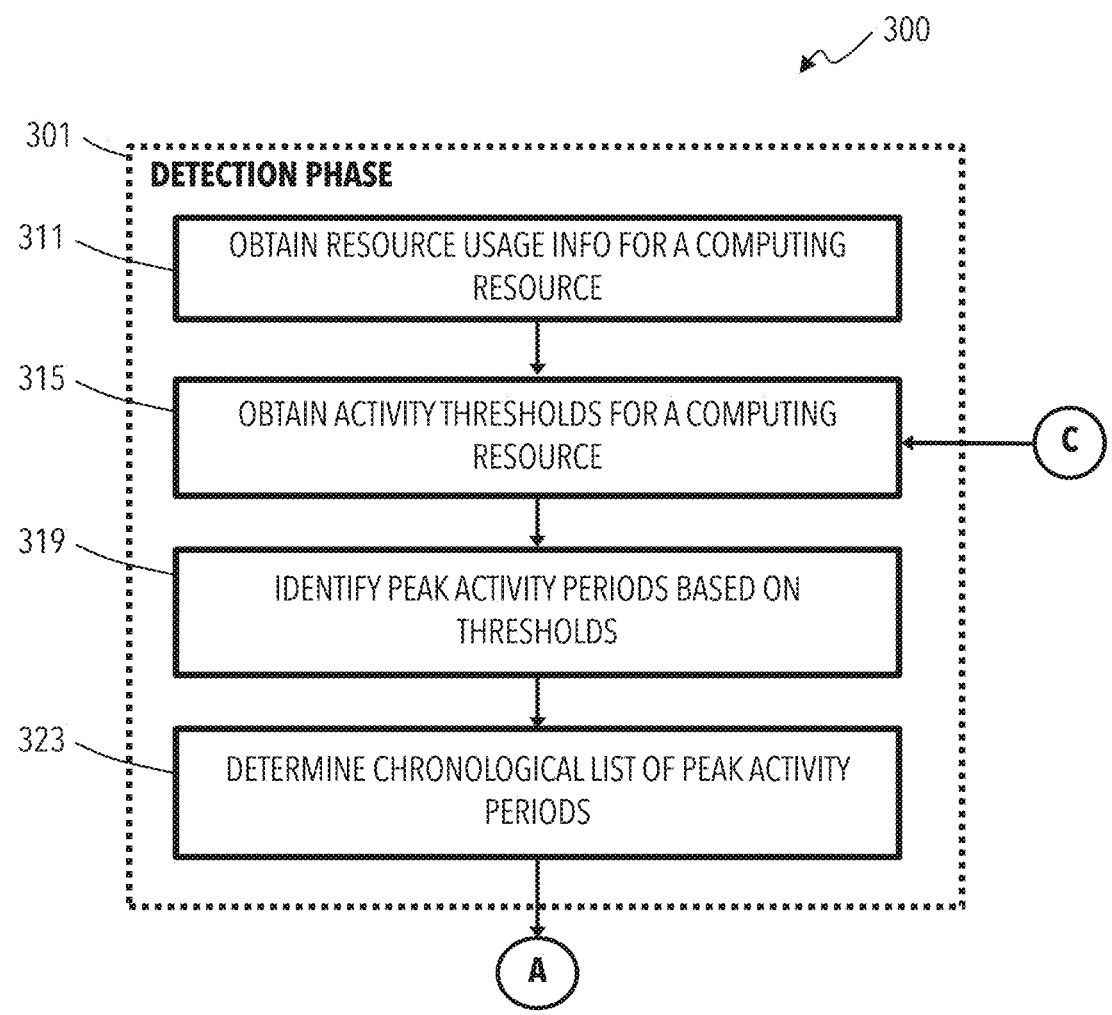
FIGS. 3A, 3B, 3C, and 3D illustrate a set of operations of an example process for determining peak activity of computing resources in accordance with one or more embodiments.

In the detection phase 301 illustrated in FIG. 3A, at block 311, a system (e.g., analytic system 115) obtains a timeline of resource usage information (e.g., usage information 121) of a computing resource (e.g., computing resources 109). As previously described, the system can obtain resource usage information over a time window from a performance monitoring utility. The resource usage information can comprise a timeline representing usage of a one or more resources periodically logged over a time period. For example, the resource usage information can be samples of CPU usage by clients of a cloud computing system logged every second, minute, hour, etc. over a time window of 12 hours, 24 hours, 1 week, etc.

At block 315, the system obtains one or more activity thresholds for the computing resource. Some embodiments obtain a predefined value for the activity threshold from a storage device (e.g., thresholds 211 in storage system 209). The value can be, for example, 30% of the maximum available resource capacity. Some embodiments receive the activity threshold from a user. For example, a system administrator can input a value for the candidate activity threshold. The system administrator can select the value of the activity threshold based on the usage information such that the threshold intersects some but not all peaks in the usage information.

Some other embodiments determine the activity threshold based on the range of the usage information included in the timeline obtained at block 311. For example, the system can calculate the threshold using a decile statistics tool. Deciles are generally used in data analysis to obtain insights into the spread and distribution of data by identifying values that are above or below certain percentiles within a dataset. Deciles divide a dataset (e.g., usage information 121) into ten equal parts, each containing an equal percentage of the data, and rank the records in the dataset in ascending order. Using the ranked dataset, the system can calculate "decile indices" representing positions within the dataset marking boundaries between the deciles. The decile indices can be calculated, for example, using the formula: $(D/10)*(n+1)$ where D is the decile number (e.g., 1 for the first decile, 2 for the second decile, etc.), n is the total number of data points in the dataset, and the "/10" portion represents the ten equal parts or deciles. Using the decile indices, the system can identify the corresponding values in the sorted dataset, which mark the boundaries of the deciles, and can be interpreted as the values below which a certain percentage of the data falls. For example, to compute the first decile (D1), the decile index would be $(1/10)*(n+1)$, which represents the position that marks the 10th percentile of the data. The corresponding value in the sorted dataset would be the value at that position. Similarly, to compute the second decile (D2), the decile index would be $(2/10)*(n+1)$, which represents the position that marks the 20th percentile of the data. The corresponding value in the sorted dataset would be the value at that position, and so on for the remaining deciles. The decile values representing the boundaries of the ten equal parts or deciles of the dataset. These values can be used to describe the distribution of the data and to identify specific points within the dataset. For example, the first decile (D1) represents the value below which 10% of the data falls, the second decile (D2) represents the value below which 20% of the data falls, and so on, up to the tenth decile (D10), which represents the maximum value in the dataset. Some embodiments can calculate decile values for the usage information and select, for example, the third decile as the activity threshold for identifying peak activity periods. It is understood that some usage information datasets are flat such that the usage information lacks distinctive peaks. Some embodiments determine standard deviation of samples of usage information and, if the samples are flat (e.g., within one or two deciles), the process 300 can end.

Figure 4A:
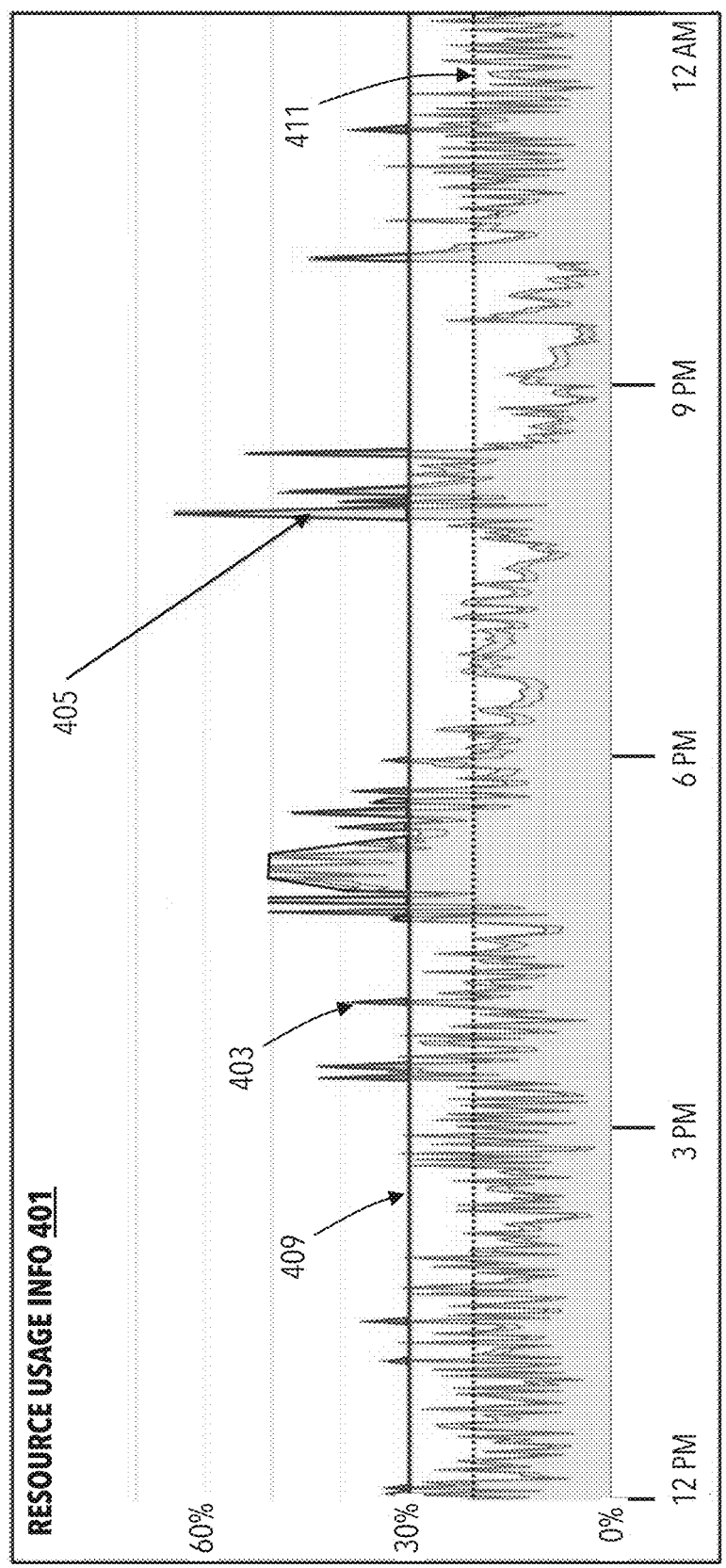
FIGS. 4A, 4B, 4C, and 4D illustrate an example of resource usage information used for determining peak activity in accordance with one or more embodiments.

At block 319, the system identifies peak activity periods in the usage information obtained at block 311 exceeding the activity threshold obtained at block 315. The peak activity periods can comprise time periods extending from a point in the timeline when the usage information crosses above the activity threshold until the next point in the timeline when the usage information crosses below the activity threshold. For example, as illustrated in FIG. 4A, the peak activity periods, such as peak activity periods 403 and 405, are the peaks in the resource usage information 401 exceeding activity threshold 409.

In cases of noisy and/or volatile usage information, some embodiments identify the peak activity periods using two activity thresholds to avoid identifying false peaks and troughs in the usage information. For example, as illustrated in FIG. 4A, the peak activity periods 403 and 405 can be compared to thresholds 409 and 411. Some embodiments can set the second activity threshold 411 lower than the first activity threshold 409. The first threshold 409 can be set to the second decile (20% of samples above it) and the second threshold 411 can be set to the third decile (30% of samples above it). The system can identify peak activity periods using the two activity thresholds 409, 411 by identifying a peak activity period each time utilization grows above the first threshold 409 and stops when utilization drops below the second threshold 411. Additionally or alternatively, some embodiments use a rolling average to smooth out short term, high intensity fluctuations of noisy and/or volatile usage information. One or both of the high and low activity thresholds can be compared to the rolling average to identify peak activity periods. To avoid smoothing out long term fluctuations, the number of samples in the averaging window can be short. For example, the number of samples in the averaging window can be capped between 2 and 8. Between these two values, the number of samples is adjusted proportionally to the total dataset duration.

At block 323, the system determines a chronological list of the peak activity periods identified at block 319 (e.g., list of peak activity periods 219). For example, the system can generate records for individual peak activity periods determined to exceed the threshold (e.g., threshold 409). The records of the data set can associate an identifier of the individual peak activity periods with a respective start time and end time. The records of the data set can be chronologically sorted based on their respective start times.

Figure 3B:
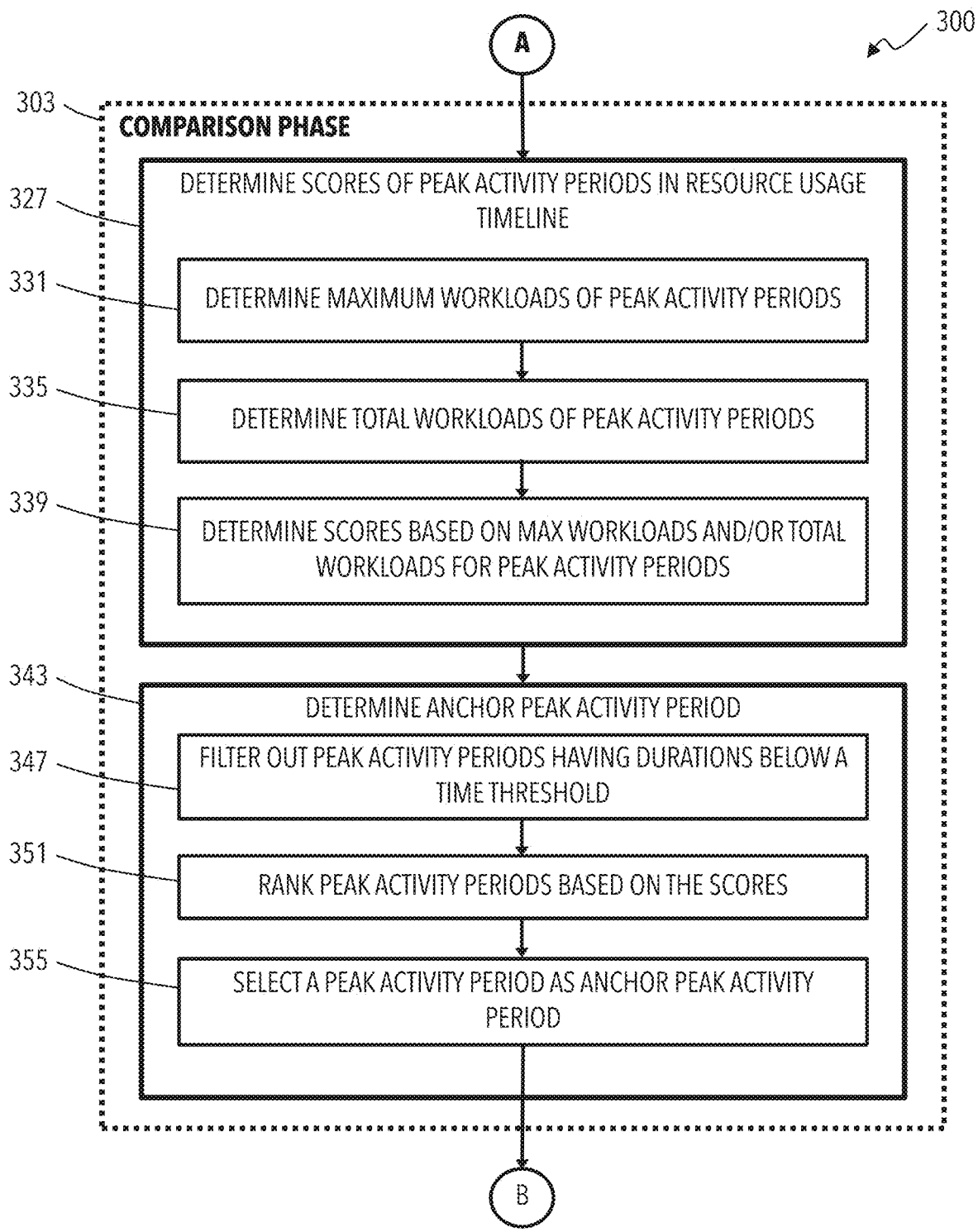

In the comparison phase 303 illustrated in FIG. 3B, at block 327, the system determines scores of the peak activity periods identified at block 319. Determining the scores can include, at block 331, determining maximum workloads of the individual peak activity periods. The maximum workload of an individual peak activity period can be determined by measuring the maximum amplitude above the threshold value (e.g., threshold 409) or a baseline value (e.g., zero). Determining the workloads can also include, at block 335, determining total workloads of the individual peak activity periods. The total workloads can be determined by calculating the surface area of a peak activity period above the threshold or zero value.

Determining the scores of the peak activity periods can also include, at block 339, determining scores based on the maximum workload determined at block 331 and/or the total workload determined at block 335 for the individual peak activity periods. For example, the score of a peak activity period can be calculated as weighted averages using the formula PAS=(W1*Wmax+W2*Wtot) where "PAS" is the peak activity score, "Wmax" is maximum workload," "Wtot" is the total workload, and W1, W2 are weights (e.g., weights 215). Some embodiments heavily weigh maximum workload in the score calculation by setting the value of weight (W1) substantially larger than weight (W2) (e.g., W1 is 7>>W2 is 3).

Additionally, in the comparison phase 303, at block 343, the system determines an anchor peak activity period. Determining the anchor peak activity period can include, at block 347, filtering out peak activity periods having durations below a time threshold. Some embodiments have a predefined time threshold (e.g., 5 minutes). Some other embodiments determine the time threshold based on a percentage (e.g., 5%) of a predefined duration (e.g., the length of the fixed length sliding window, as described below regarding block 365). Some other embodiments determined the time threshold based on the time frame of the usage data (e.g., 1% of the total duration of the usage information.).

Determining the anchor peak activity period can also include, at block 351, ranking the peak activity periods based on the respective scores determined at block 327. Some embodiments exclude the peak activity periods filtered at block 347 from the ranking. It is understood that the process 300 may be unable to identify an anchor peak activity period in some usage information, such as when all the peak activity periods are shorter than 5% of the target duration. In such cases, the system can end the process 300.

Determining the anchor peak activity period can also include, at block 355, selecting a peak activity period as the anchor peak activity period. The selection of the anchor peak activity period can include identifying one of the peak activity periods having the highest score or the highest rank determined at block 351. The selection can exclude the peak activity periods filtered out at block 347 and the anchor peak activity period can be the first peak activity period in the chronological list that is not filtered out. For example, in FIG. 4A, peak activity period 405 can be selected as the anchor peak activity period based on having the greatest score determined at block 327.

Figure 3C:
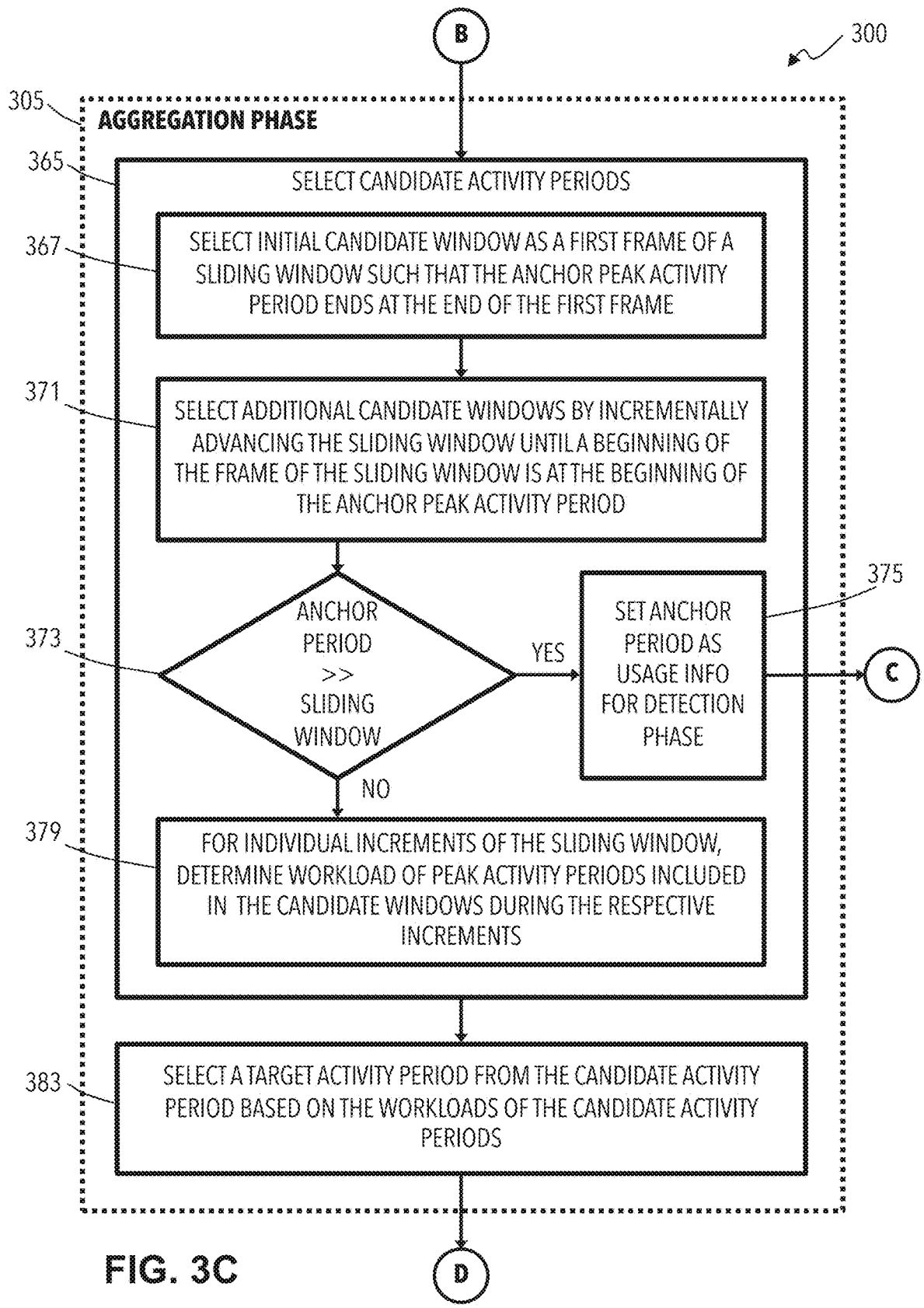

In the aggregation phase 305 illustrated in FIG. 3C, at block 365, the system selects candidate activity periods. The system can select candidate activity periods in and around the anchor peak activity period determined at block 343 using a sliding window having a fixed duration for selecting activity periods for peak usage analysis. Selecting the candidate activity periods can include incrementally advancing the window in the direction of the time flow of the usage information from an initial frame to a final frame, as detailed below. Some embodiments obtain a predefined duration of the sliding window (e.g., window duration 217) from a storage device (e.g., storage system 209). Some other embodiments receive the duration of the window from a user. For example, a system administrator can input the duration of the window. Some other embodiments determine the duration of the window based on the duration of the usage information obtained at block 311. For example, the system can set the duration of the window to be 10% of the total duration of the usage information.

Figure 4B:
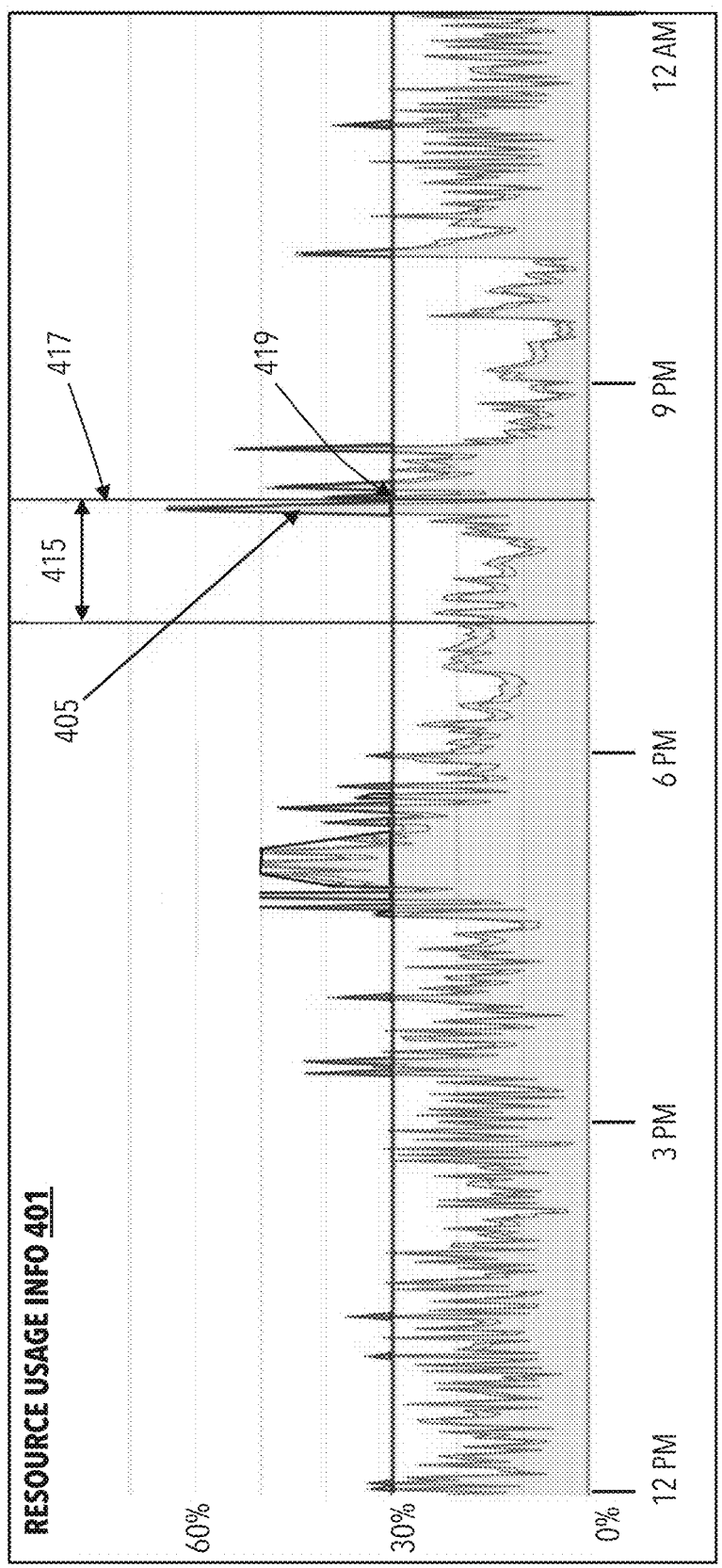

Selecting the candidate activity periods can include, at block 367, selecting an initial candidate window as the initial frame of the sliding window, such that the anchor peak activity period ends at the end of the initial frame of the sliding window. For example, FIG. 4B shows an initial candidate window selected using a sliding window 415. For the initial candidate window, an end 417 of the sliding window 415 is positioned at the end 419 of the peak activity period 405, such that the end 417 of the sliding window 415 intersects with the threshold 409.

Figure 4C:
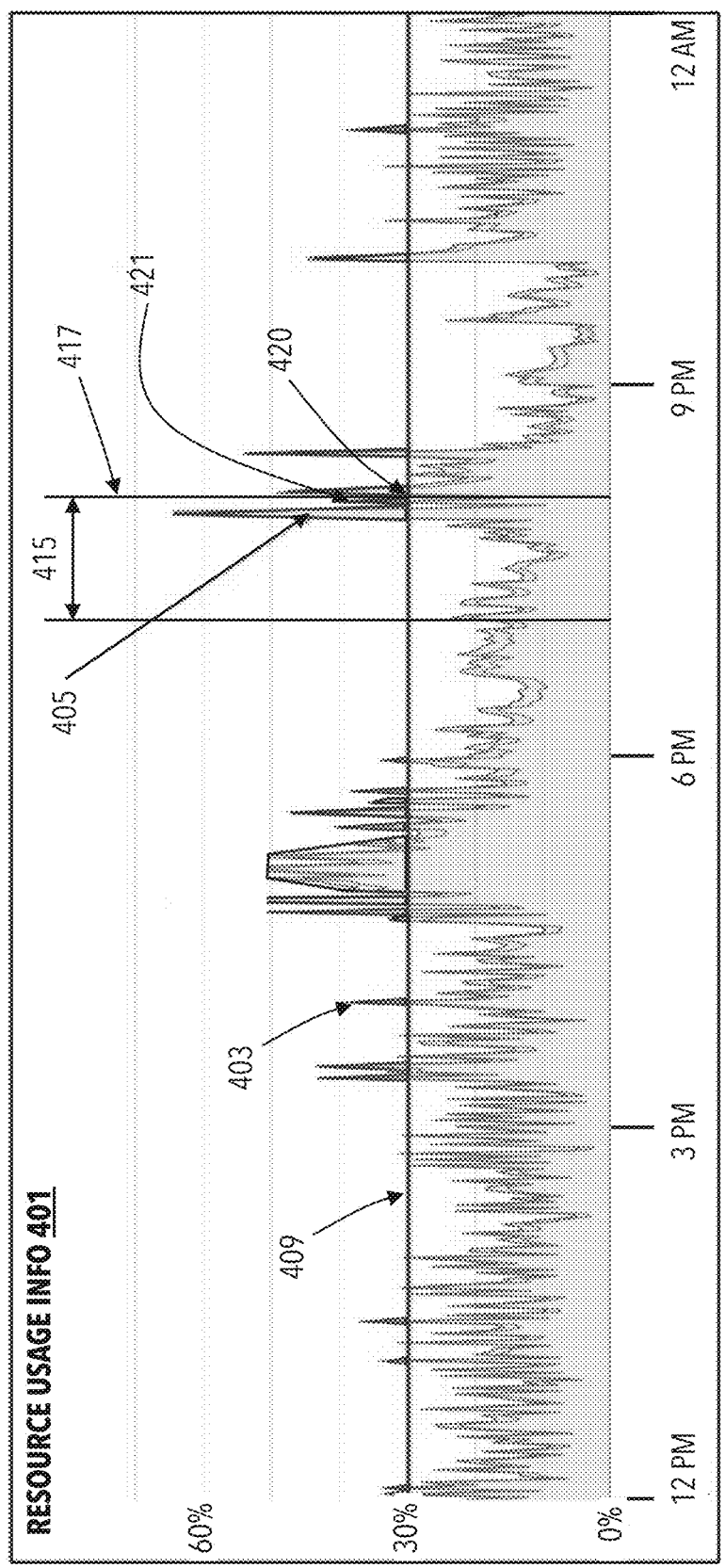
Figure 4D:
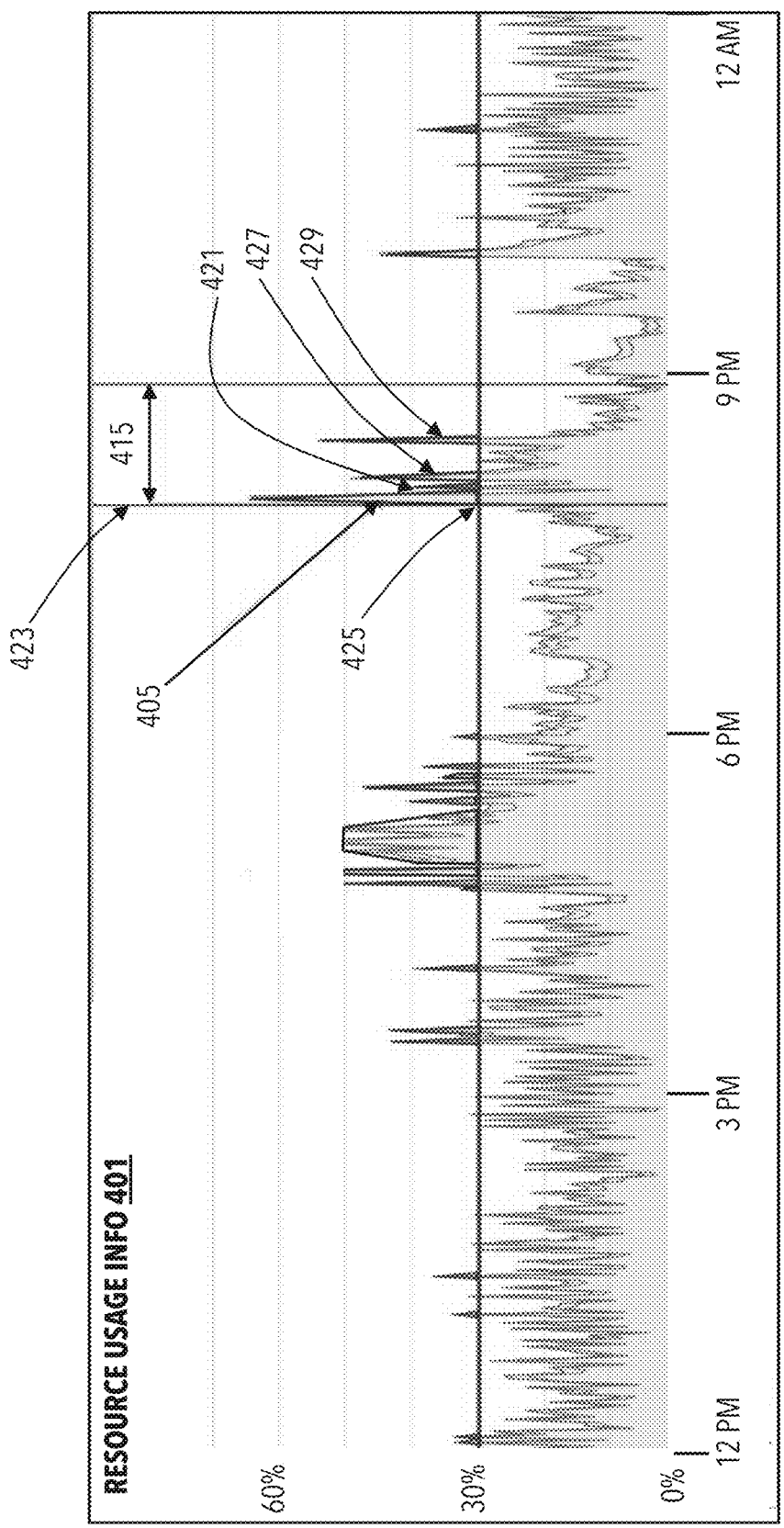

Selecting the candidate activity periods can also include, at block 371, selecting additional candidate windows by incrementally advancing the sliding window until a final frame of the sliding window, such that a beginning of the sliding window is at the beginning of the anchor peak activity period. For example, FIG. 4D shows a beginning 423 of the sliding window 415 positioned at the beginning 425 of the anchor peak activity period 405.

Between the initial and final frames of the sliding window 415, the system incrementally moves the sliding window to select additional candidate windows. The increments in some embodiments are selected such that, for each increment, the position of the sliding window is set where the end of the window matches the end of the next peak activity period in the chronological list determined at block 323. For example, FIG. 4C shows the end 417 of the sliding window 415's frame positioned at the end 420 of peak activity period 421 where a trailing edge of the peak activity period 421 intersects the threshold 409.

At block 373, the system determines whether the length of the anchor period is substantially larger than the length of the sliding window. For example, situations may occur in which the resource information includes a long plateau. The system may identify the entire plateau as the anchor period. However, the duration of the plateau may be longer than the time period of the sliding window. In such cases, the anchor period may actually represent a period of peak activity. Instead the plateau itself include a period of peak activity.

Some embodiments determine that the anchor period is substantially larger than the length of the sliding window by calculating a difference in the respective durations of the peak activity period and sliding window. Some other embodiments make the determination based on a quantity of candidate windows exceeding a predetermined maximum quantity. For example, the system may determine that the length of the anchor period is substantially larger than the length of the sliding window when, at block 371, twenty candidate windows are selected. If the system determines that the length of the anchor period is substantially larger than the of the sliding window (e.g., block 373 is "Yes,"), then at block 375 the system can set the anchor period as the usage information for evaluation during the detection phase and the process can recursively return to block 315, as indicated by off-page connector "C." Doing so enables the system to detect peak activity periods in, for example, the plateau described above. Some embodiments limit the number of times step 375 can be performed to prevent an endless recursion, such is when the usage data is substantially flat. On the other hand, if the system determines that the length of the anchor period is not substantially larger than the length of the sliding window (e.g., block 373 is "No,"), then the process 300 proceeds to block 379.

At block 379, the system determines workloads of the candidate activity periods included in the candidate windows selected during the individual increments of blocks 367 and 371. For example, for the increment of the sliding window 415 illustrated in FIG. 4D, the system can determine an aggregated workload of the four peak activity periods 405, 421, 427, and 429 included in the candidate window defined by the sliding window 415. Some embodiments exclude from the aggregated workload any peak activity periods overlapping with the window 415 or otherwise not entirely included in the window 415.

At block 383, the system selects a target activity period from the candidate activity periods selected at block 365 based on the aggregated workloads of the individual candidate activity periods determined at block 379. Some embodiments rank each candidate activity period based on the workloads and select the candidate activity period having the highest workload.

Figure 3D:
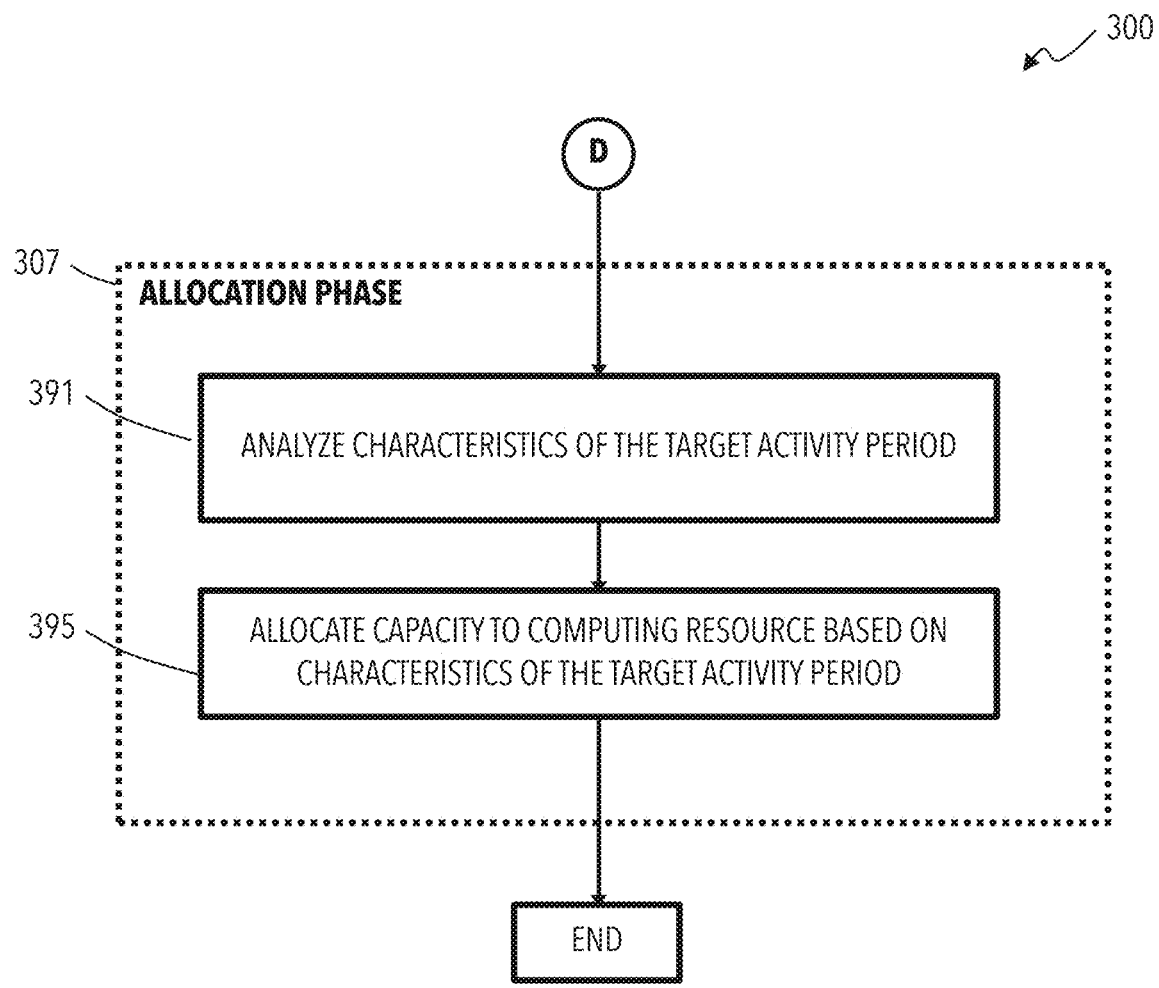

In the allocation phase 307, which is illustrated in FIG. 3D, at block 391, the system can analyze the characteristics of the candidate activity period selected at block 383. The characteristics can include a maximum workload, average workload, and a total workload of the candidate activity period. The characteristics can include other metrics, such as maximum increase or maximum sustained usage during the candidate activity period. It is understood that other metrics of amount and rate of usage and workload can be used. At block 395, the system can allocate capacity to the computing resource based on the characteristics analyzed at block 391. Allocating capacity can include generating a notification to a system administrator advising the administrator of potential or actual resource starvation.

E. Computer Networks and Cloud Networks

In one or more embodiments, a computer network provides connectivity among a set of nodes (e.g., nodes 133). The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client (e.g., client device 111) may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network (e.g., communication links 117) provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use the same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or data set, stored by the computer network, is tagged with a tenant ID. A tenant is permitted access to a particular application, data structure, and/or data set only if the tenant and the particular application, data structure, and/or data set are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

F. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the present disclosure, and what is intended by the applicants to be the scope of the claims, is the literal and equivalent scope of the set of claims that issue from this application, in the specific form in which such claims issue, including any subsequent correction.

G. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
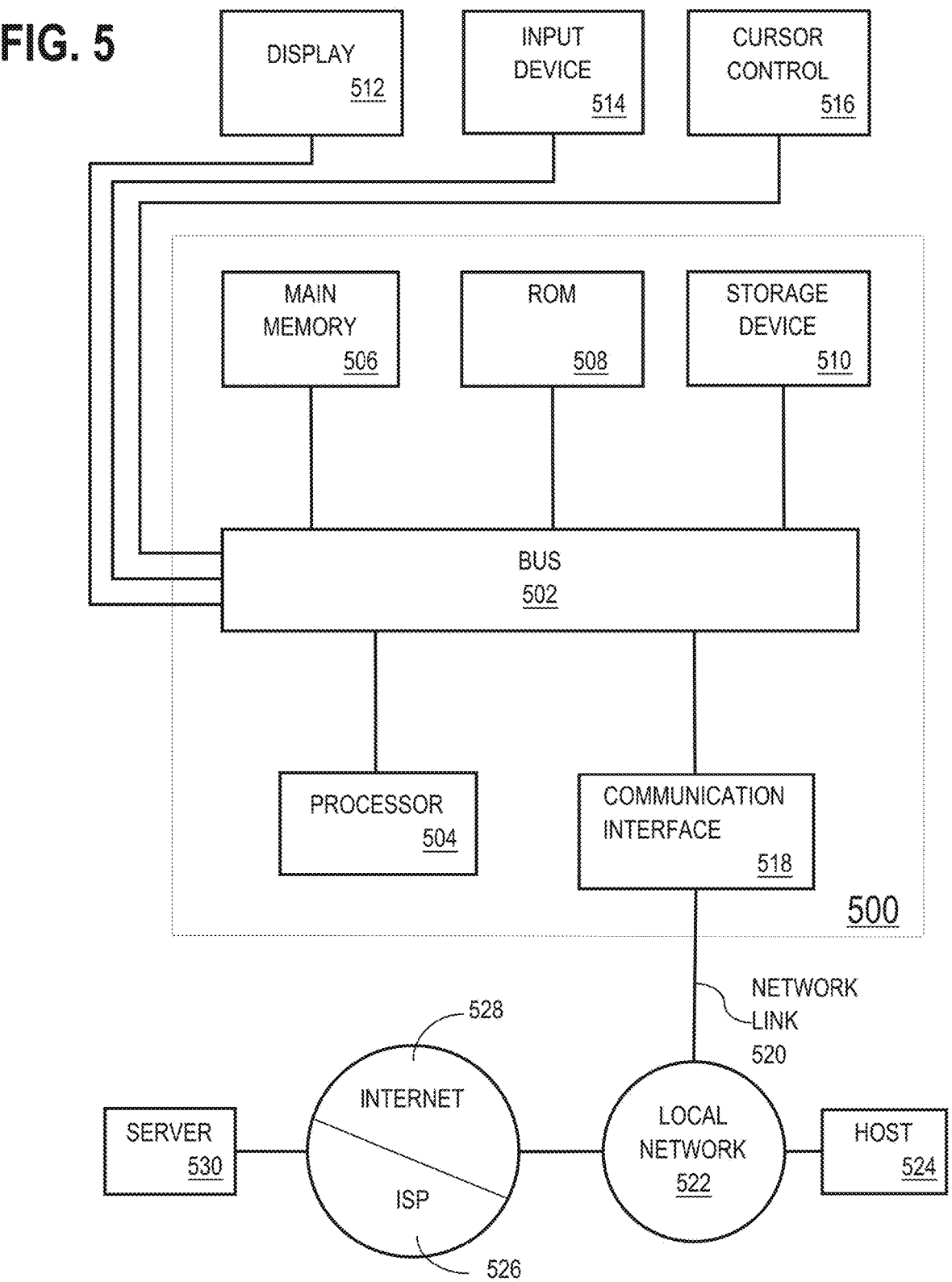
FIG. 5 shows a block diagram illustrating an example computer system in accordance with one or more embodiments.

For example, FIG. 5 is a block diagram that illustrates a computer system 500 upon which an embodiment may be implemented. Computer system 500 includes a bus 502 or other communication mechanism for communicating information, and a processor 504 coupled with bus 502 for processing information. Processor 504 may be, for example, a general-purpose microprocessor.

Computer system 500 also includes a main memory 506, such as a random-access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 enables two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the present disclosure, and what is intended by the applicants to be the scope of the claims, is the literal and equivalent scope of the set of claims that issue from this application, in the specific form in which such claims issue, including any subsequent correction.

What is claimed is:

1. One or more non-transitory computer-readable media storing program instructions that, when executed by one or more hardware processors, cause performance of operations comprising:
   determining a plurality of peak activity periods in a timeline representing usage of a computing resource based on the usage exceeding a first threshold during the plurality of peak activity periods;
   determining respective scores for individual peak activity periods of the plurality of peak activity periods based on one or more of:
      a maximum workload during the individual peak activity periods; and
      a total workload for the durations of the individual peak activity periods exceed the first threshold;
   selecting an anchor peak activity period from the plurality of peak activity periods based on the respective scores of the individual peak activity periods;
   determining a plurality of candidate activity periods that each include the anchor peak activity period;
   determining a plurality of workload values respectively corresponding to the plurality of candidate activity periods;
   selecting a target activity period, from the plurality of candidate activity periods, based on the plurality of workload values corresponding respectively to the plurality of candidate activity periods; and
   allocating capacity to the computing resource based on characteristics of the target activity period.

2. The one or more non-transitory computer-readable media of claim 1, wherein:
   determining scores for the individual peak activity period comprises: computing a weighted average of the maximum workload and the total workload during the individual peak activity periods; and
   the operations further comprise: computing the first threshold based on the range of usage values included in the timeline.

3. The one or more non-transitory computer-readable media of claim 1, wherein selecting the anchor peak activity period from the plurality of peak activity periods comprises:
   selecting a first peak activity period having the highest score of the plurality of peak activity periods.

4. The one or more non-transitory computer-readable media of claim 3, wherein selecting the anchor peak activity period from the plurality of peak activity periods further comprises:
   selecting the anchor peak based on a duration of a time period during which the maximum workload for the anchor peak activity period was detected.

5. The one or more non-transitory computer-readable media of claim 1, wherein determining the plurality of candidate activity periods that each include the anchor peak activity period comprises:
   computing the plurality of peak activity periods using a sliding window having a fixed duration,
   wherein the anchor peak activity period is at the end of an initial frame of the sliding window.

6. The one or more non-transitory computer-readable media of claim 5, wherein:
   the anchor peak activity period is at the start of a final frame of the sliding window.

7. The one or more non-transitory computer-readable media of claim 1, wherein:
   allocating capacity to the computing resource based on characteristics of the anchor peak activity period comprises:
   identifying a subset of one or more peak activity periods of the plurality of peak activity periods within the target activity period; and
   allocating capacity to the computing resource based on characteristics of the subset of the one or more peak activity periods.

8. The one or more non-transitory computer-readable media of claim 7, wherein allocating capacity to the computing resource based on characteristics of the subset of the one or more peak activity periods comprises:
   identifying a portion of workload activity, during the subset of the one or more peak activity periods, corresponding to workload above the first threshold; and
   allocating capacity to the computing resource based on the portion of workload activity, during the subset of the one or more peak activity periods, corresponding to workload above the first threshold.

9. The one or more non-transitory computer-readable media of claim 1, wherein selecting an anchor peak activity period from the plurality of peak activity periods based on the respective scores of the plurality of peak activity periods comprises:
   ranking the individual peak activity periods based on the respective scores,
   wherein the ranking excludes one or more of the individual peak activity periods having a duration less than a time threshold.

10. The one or more non-transitory computer-readable media of claim 1, wherein determining the plurality of peak activity periods in the timeline further comprises:
   determining the plurality of peak activity periods in the timeline based on the usage decreasing below a second threshold after exceeding the first threshold.

11. A method comprising:
   determining a plurality of peak activity periods in a timeline representing usage of a computing resource based on the usage exceeding a first threshold during the plurality of peak activity periods;
   determining respective scores for individual peak activity periods of the plurality of peak activity periods based on one or more of:
      a maximum workload during the individual peak activity periods; and
      a total workload for the durations of the individual peak activity periods exceed the first threshold;

selecting an anchor peak activity period from the plurality of peak activity periods based on the respective scores of the individual peak activity periods;
determining a plurality of candidate activity periods that each include the anchor peak activity period;
determining a plurality of workload values respectively corresponding to the plurality of candidate activity periods;
selecting a target activity period, from the plurality of candidate activity periods, based on the plurality of workload values corresponding respectively to the plurality of candidate activity periods; and
allocating capacity to the computing resource based on characteristics of the target activity period.

12. The method of claim 11, wherein:
determining scores for the individual peak activity period comprises: computing a weighted average of the maximum workload and the total workload during the individual peak activity periods; and
the method further comprises: computing the first threshold based on the range of usage values included in the timeline.

13. The method of claim 11, wherein selecting the anchor peak activity period from the plurality of peak activity periods comprises:
selecting the first peak activity period having the highest score of the plurality of peak activity periods.

14. The method of claim 13, wherein selecting the anchor peak activity period from the plurality of peak activity periods further comprises:
selecting the anchor peak based on the duration of a time period during which the maximum workload for the anchor peak activity period was detected.

15. The method of claim 11, wherein determining the plurality of candidate activity periods that each include the anchor peak activity period comprises:
computing the plurality of peak activity periods using a sliding window having a fixed duration,
wherein the anchor peak activity period is at the end of an initial frame of the sliding window.

16. The method of claim 15, wherein:
the anchor peak activity period is at the start of the final frame of the sliding window.

17. The method of claim 11, wherein allocating capacity to the computing resource based on characteristics of the anchor peak activity period comprises:
identifying a subset of one or more peak activity periods of the plurality of peak activity periods within the target activity period; and
allocating capacity to the computing resource based on characteristics of the subset of the one or more peak activity periods.

18. The method of claim 17, wherein allocating capacity to the computing resource based on characteristics of the subset of the one or more peak activity periods comprises:
identifying a portion of workload activity, during the subset of the one or more peak activity periods, corresponding to workload above the first threshold; and
allocating capacity to the computing resource based on the portion of workload activity, during the subset of the one or more peak activity periods, corresponding to workload above the first threshold.

19. The method of claim 11, wherein selecting an anchor peak activity period from the plurality of peak activity periods based on the respective scores of the plurality of peak activity periods comprises:

ranking the individual peak activity periods based on the respective scores,
wherein the ranking excludes one or more of the individual peak activity periods having a duration less than a time threshold.

20. The method of claim 11, wherein determining the plurality of peak activity periods in the timeline further comprises:
determining the plurality of peak activity periods in the timeline based on the usage decreasing below a second threshold after exceeding the first threshold.

21. A system comprising:
at least one device including a hardware processor; and
a non-transitory computer-readable storage device storing program instruction that, when executed by the hardware processor, configure the system to perform operations comprising:
determining a plurality of peak activity periods in a timeline representing usage of a computing resource based on the usage exceeding a first threshold during the plurality of peak activity periods;
determining respective scores for individual peak activity periods of the plurality of peak activity periods based on one or more of:
a maximum workload during the individual peak activity periods; and
a total workload for the durations of the individual peak activity periods exceed the first threshold;
selecting an anchor peak activity period from the plurality of peak activity periods based on the respective scores of the individual peak activity periods;
determining a plurality of candidate activity periods that each include the anchor peak activity period;
determining a plurality of workload values respectively corresponding to the plurality of candidate activity periods;
selecting a target activity period, from the plurality of candidate activity periods, based on the plurality of workload values corresponding respectively to the plurality of candidate activity periods; and
allocating capacity to the computing resource based on characteristics of the target activity period.

22. The system of claim 21, wherein:
determining scores for the individual peak activity period comprises: computing a weighted average of the maximum workload and the total workload during the individual peak activity periods; and
the operations further comprise: computing the first threshold based on the range of usage values included in the timeline.

23. The system of claim 21, wherein selecting the anchor peak activity period from the plurality of peak activity periods comprises:
selecting the first peak activity period having the highest score of the plurality of peak activity periods.

24. The system of claim 23, wherein selecting the anchor peak activity period from the plurality of peak activity periods further comprises:
selecting the anchor peak based on the duration of a time period during which the maximum workload for the anchor peak activity period was detected.

25. The system of claim 21, wherein determining the plurality of candidate activity periods that each include the anchor peak activity period comprises:
computing the plurality of peak activity periods using a sliding window having a fixed duration, wherein the anchor peak activity period is at the end of an initial frame of the sliding window.

26. The system of claim 25, wherein:
the anchor peak activity period is at the start of a final frame of the sliding window.

27. The system of claim 21, wherein allocating capacity to the computing resource based on characteristics of the anchor peak activity period comprises:
identifying a subset of one or more peak activity periods of the plurality of peak activity periods within the anchor peak activity periods; and
allocating capacity to the computing resource based on characteristics of the subset of the one or more peak activity periods.

28. The system of claim 27, wherein allocating capacity to the computing resource based on characteristics of the subset of the one or more peak activity periods comprises:
identifying a subset of one or more peak activity periods of the plurality of peak activity periods within the target activity period; and
allocating capacity to the computing resource based on characteristics of the subset of the one or more peak activity periods.

29. The system of claim 21, wherein selecting an anchor peak activity period from the plurality of peak activity periods based on the respective scores of the plurality of peak activity periods comprises:
ranking the individual peak activity periods based on the respective scores,
wherein the ranking excludes one or more of the individual peak activity periods having a duration less than a time threshold.

30. The system of claim 21, wherein determining the plurality of peak activity periods in the timeline further comprises:
determining the plurality of peak activity periods in the timeline based on the usage decreasing below a second threshold after exceeding the first threshold.

* * * * *